Aug. 26, 1947.  H. W. HAPMAN  2,426,304
BUCKET CONVEYER SYSTEM
Filed Oct. 1, 1942  4 Sheets-Sheet 1
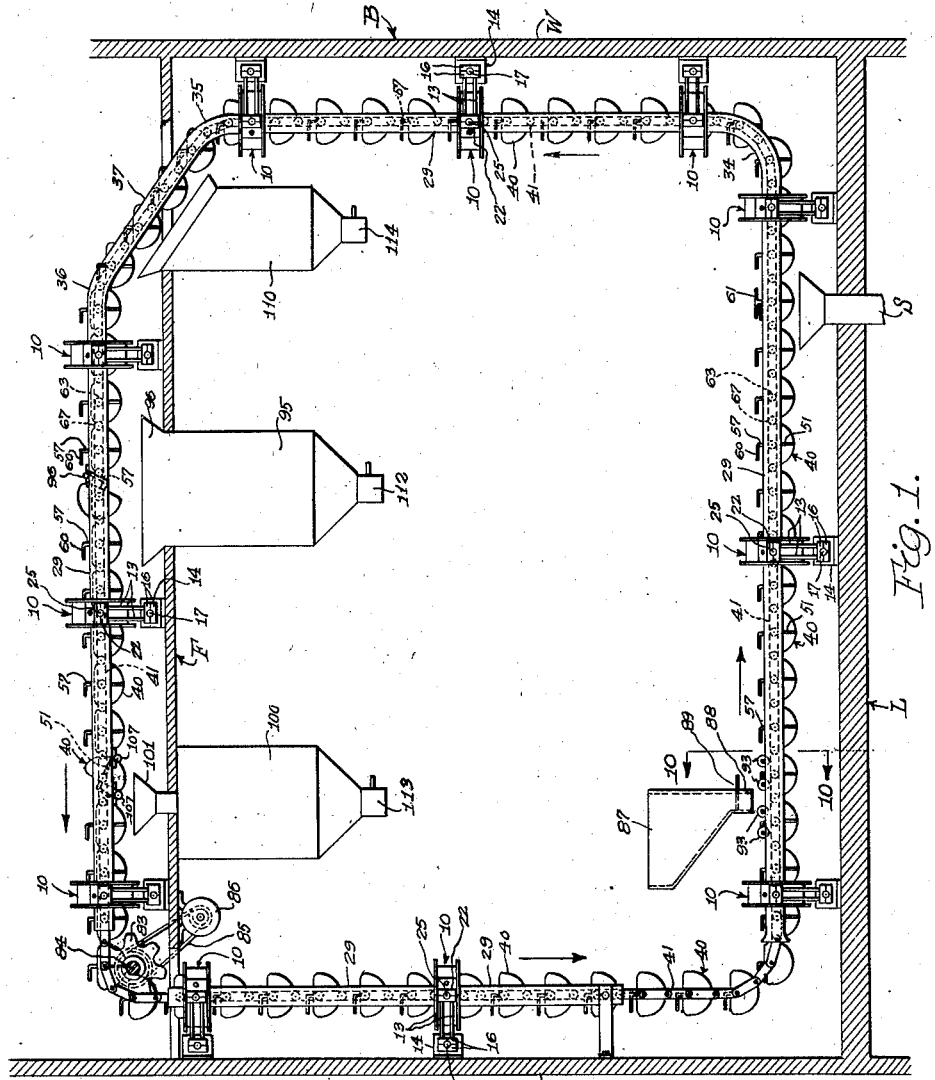
Inventor
Henry W. Hapman
By Barthel & Bugbee
Attorney Aug. 26, 1947.  H. W. HAPMAN  2,426,304
BUCKET CONVEYER SYSTEM
Filed Oct. 1, 1942  4 Sheets-Sheet 2
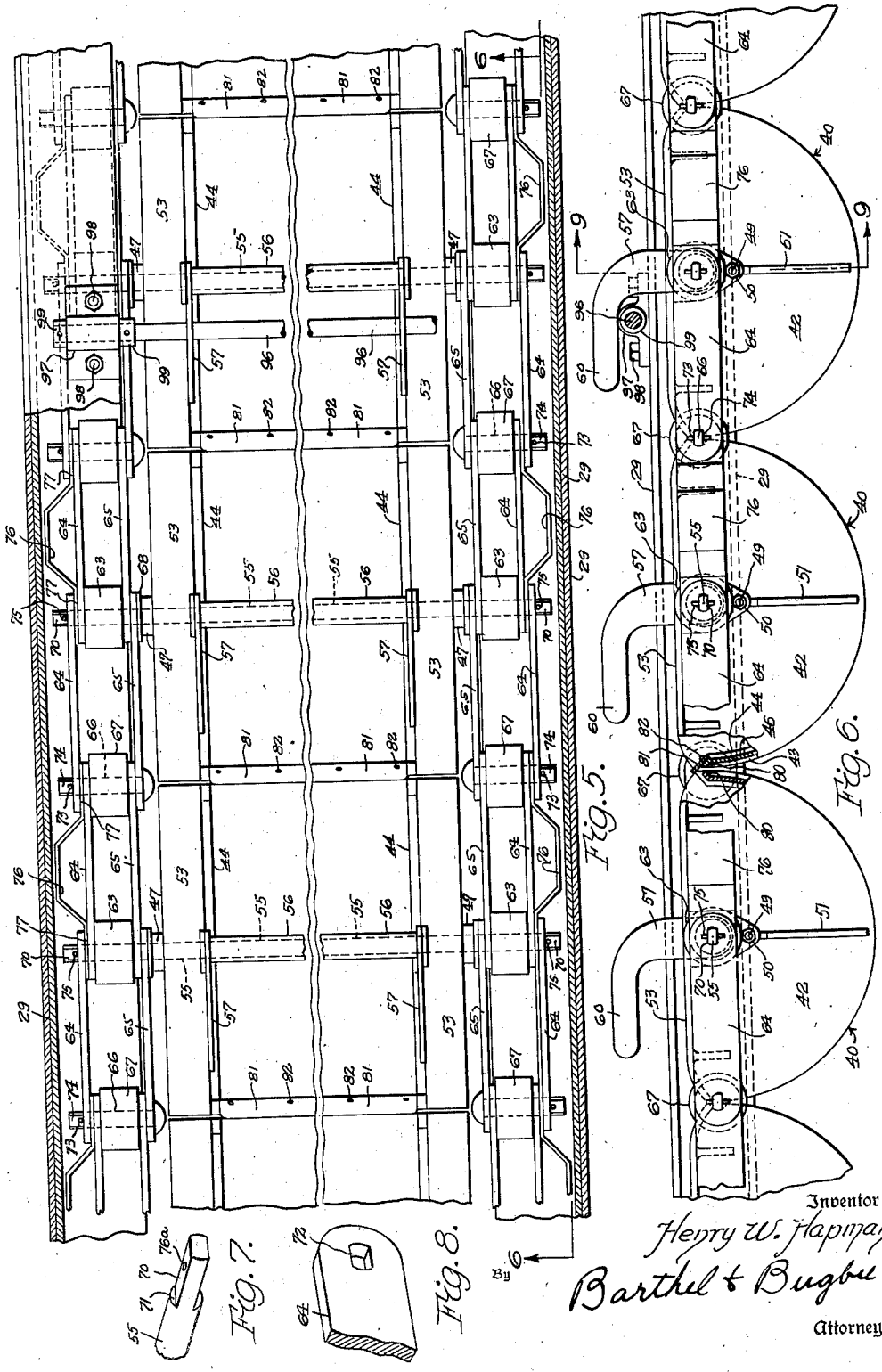
Inventor
Henry W. Hapman
By Barthel & Bugbee
Attorneys

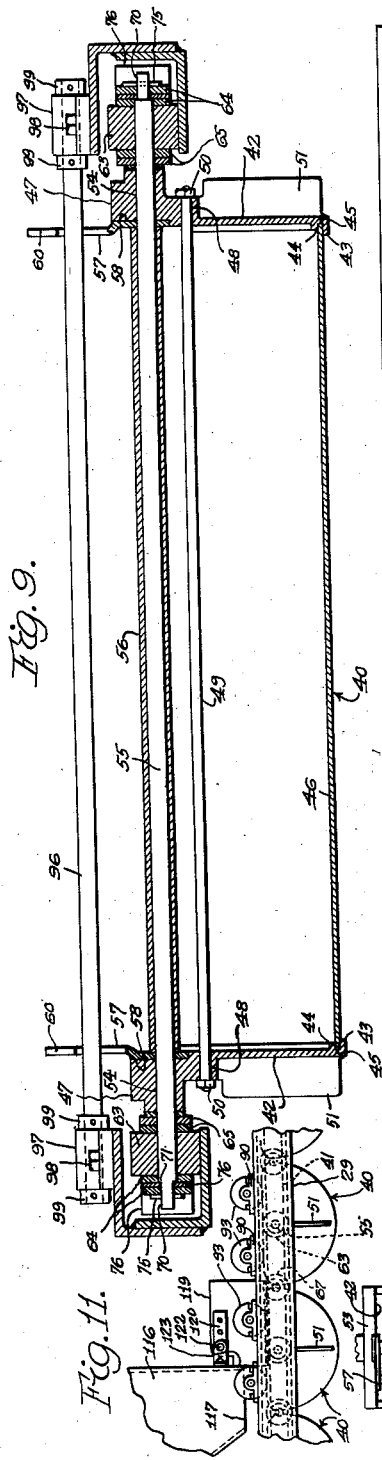

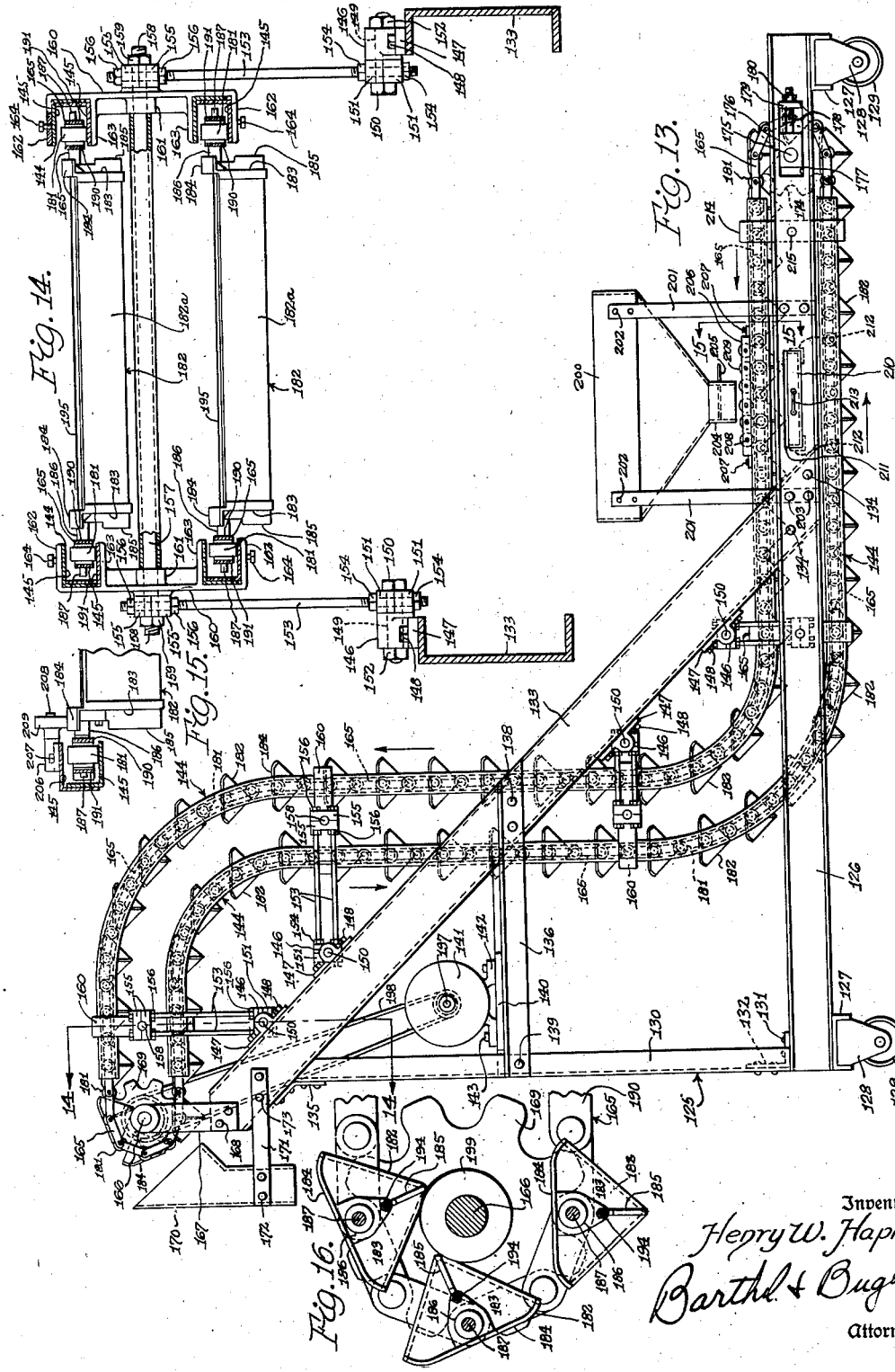

Patented Aug. 26, 1947

2,426,304

UNITED STATES PATENT OFFICE 2,426,304

BUCKET CONVEYOR SYSTEM

Henry W. Hapman, Detroit, Mich.

Application October 1, 1942, Serial No. 460,337

11 Claims. (Cl. 198—145)

1

The present invention relates to improvements in conveyors and more particularly to bucket type conveyors.

The principal object of the invention is to provide a conveyor capable of being readily constructed and assembled and which may be knocked down or taken apart and transported to other localities or positions.

Another object of the invention is to provide a unique bucket construction for conveyors which comprises comparatively few parts which may be easily assembled without requiring the use of skilled labor or technicians.

Another object of the invention is to provide a trackway of channel formation for guiding the bucket in a circuitous path and by forming the channel ways into various depths, different paths may be established for guiding the bucket conveyors.

Another object of the invention is to provide supporting means for the channel guide ways at spaced intervals throughout the length of the various courses whereby the conveyor may be installed in various positions and locations as desired.

Another object of the invention is to provide a bucket type conveyor in which the buckets are carried by a pair of sprocket chains and such sprocket chains and buckets are adapted to be guided by the channel-shaped guide ways without requiring the use of numerous sprockets at the corners thereby eliminating the expense of such sprockets and the gearing instant thereto.

Another object of the invention is to provide means for maintaining the buckets of the conveyor in a horizontal position during the loading thereof so that the buckets will be prevented from tilting and the resultant displacement of the material therefrom.

Another object of the invention is to provide a conveyor bucket structure having means carried by one edge for engaging an adjacent bucket and sealingly spaced therebetween so as to further prevent the passage of the material between the buckets during the loading thereof.

Another object of the invention is to provide means for dumping the buckets as they arrive at a dumping station and said means includes various shaped arms detachably carried by each bucket the shape of which depends upon the position of the dumping and the direction of travel of the conveyor. By substituting various shaped arms the buckets may be dumped on horizontal or diagonal runs.

Another object of the invention is to provide rollers or the like in the path of travel of the guide ways on the buckets which are adapted to completely rotate the bucket when the same is dumped to insure the displacement of the contents of each bucket as it passes over an unloading station.

Another object of the invention is to provide means adjacent the loading station of a bucket conveyor for spreading the material lengthwise of the bucket so that the bucket when loaded will have a low center of gravity and will be prevented from being tilted during its travel on the vertical and horizontal runs.

Another object of the invention is to provide a bucket conveyor in which the buckets are connected by sprocket chains guided in channel-ways throughout the various runs and to provide means carried by the sprocket chains for preventing the conveyor bucket supporting rods from contacting the bottom walls of the guide channel thereby preventing injury thereto as well as eliminating friction and the rotation of the conveyor during its circuitous travel.

Another object of the invention is to provide a bucket conveyor of the above mentioned type capable of being supported by a portable frame so that the bucket conveyor may be wheeled from one position to another depending upon the character of its use.

Another object of the invention is to provide a bucket conveyor in which each bucket is provided with a wing portion adapted to extend into the path of a roller at the end of the conveyor flight so that the bucket will be tilted during its traverse of one of the sprockets arranged in a dumping position above a hopper or the like.

Another object of the invention is to provide a conveyor of the bucket type in which a channel-shaped guide way is adapted to be supported from horizontal and angularly disposed beams by means of supporting brackets connected thereto and arranged so that the channel guide member will be arcuately braced both vertically and horizontally.

Another object of the invention is to provide means for taking up slack or wear in the endless bucket chains so that overcrowding of the channel ways will be prevented when the sprocket chains have become worn and elongated.

Another object of the invention is to provide means beneath the loading station for collecting material which may find its way through the spaces between the buckets of the conveyor so that waste will be eliminated as much as possible.

Other objects and advantages of the invention will become apparent during the course of the description of the accompanying drawings wherein, Fig. 1 is a side elevational view of a preferred embodiment of the invention illustrating the bucket conveyor supported within a walled chamber such as the room of a building or the like.

Fig. 2 is an enlarged fragmentary side elevational view of the bucket conveyor illustrating one of the dumping means for causing the complete revolution of each bucket as it traverses the unloading station;

Fig. 3 is a vertical cross sectional view taken on line 3—3 of Fig. 2 looking in the direction of the arrows illustrating the parts greatly enlarged and showing the manner in which the bucket is supported upon rollers travelling in channel ways;

Fig. 4 is an enlarged fragmentary side elevational view of the angular portion of the guide ways showing the buckets as they traverse the inclination and illustrating a dumping means for such buckets when it is desired to dump in angular positions;

Fig. 5 is a top plan view of one of the conveyor horizontal runs showing portions thereof broken away to illustrate the manner in which the conveyor buckets are guided by the opposite channel ways;

Fig. 6 is a longitudinal cross sectional view taken on line 6—6 of Fig. 5 looking in the direction of the arrows illustrating the relative positions of the conveyor bucket and showing in detail the sealing strip between adjacent buckets;

Fig. 7 is a perspective view of an end portion of one of the conveyor bucket supporting bars showing the end reduced to limit the inward movement of the outer chain links;

Fig. 8 is an enlarged perspective view of one of the chain links illustrating the slotted opening therein adapted to be received in a reduced portion of the conveyor supporting rod;

Fig. 9 is a vertical cross sectional view taken on line 9—9 of Fig. 6 looking in the direction of the arrows further illustrating the structure of the conveyor bucket and as showing the manner in which one of the tripper rods is positioned between the conveyor channel guides;

Fig. 10 is a vertical cross sectional view taken on the line 10—10 of Fig. 1 looking in the direction of the arrows omitting the supply hopper and illustrating a guide frame and supporting means therefor;

Fig. 11 is a fragmentary side elevational view of a bucket conveyor showing the manner in which the buckets are maintained in a horizontal position during their passage beneath a loading station and further illustrating a scraper plow to level the contents of the bucket to a predetermined height;

Fig. 12 is a horizontal plan view illustrating the loading station and the relative passage of a bucket therebeneath to illustrate the manner in which the plow will spread the material after being fed to the bucket;

Fig. 13 is a side elevational view of a modified form of the invention in which the conveyor is shown as being supported upon the particular frame having a lower feeding station and an uppermost dumping position;

Fig. 14 is a vertical cross sectional view taken on line 14—14 of Fig. 13 looking in the direction of the arrows showing in detail the manner in which the guide channel members are supported from the portable frame structure;

Fig. 15 is a vertical cross sectional view taken on line 15—15 of Fig. 13 looking in the direction of the arrows and illustrating in detail the manner in which the buckets are maintained in a horizontal position, and Fig. 16 is an enlarged end elevational view illustrating the manner in which the buckets are tilted and rotated as they reach their dumping position.

*General construction and arrangement*

The invention generally comprises a pair of opposed channel guide members adapted to be supported upon a wall, frame work or frame structure in such a manner that the guide channels may be adjusted and fitted to various positions so that the buckets will travel in a predetermined circuitous path. The invention also contemplates a conveyor bucket structure in which each of the buckets is formed with end wall portions either molded or stamped and the bucket portion between the end walls is formed of a sheet of bendable material of a flexible nature. The buckets are supported on suitable transversely extending bars which form the alternate pins of an endless chain having spaced links between which are located supporting rollers for the chain and the conveyor buckets. The entire bucket assembly is held in position by means of a longitudinal bolt extending from the side walls through the bucket so that the side walls may be clamped into engagement with the flexible curved portion of the bucket. Further, each stamped formation at the end wall is provided with horizontal ribs for engagement by rollers as the bucket traverses the loading station. In addition to the ribs, wing portions are formed therebetween which are adapted to engage rollers arranged in spaced relation adjacent the runs or unloading station of the conveyor.

In the event that it is desired to dump the bucket at various localities detachable dumping or tripping arms may be fastened to the end wall of the bucket so that the dumping arms will engage a dumper rod during the travel of the conveyor to rock the bucket and dump the contents thereof. By simply changing the formation or shape of the tripper arms the buckets may be tripped or dumped in various positions of travel as indicated in Fig. 1 of the drawings. Each of the buckets is provided with a sealing strip along one edge extending diagonally toward the adjacent bucket so that said strip will overlie the adjacent bucket edge and prevent material from being lodged between the buckets and falling therethrough.

In the specific bucket construction the parts are so arranged that they may be interchanged when broken or damaged and replaced by new parts without requiring the conveyor assembly to be dismantled and thereby only interrupting the use of the conveyor a small amount of time as compared with the time employed in the repair of other bucket elevators or conveyors of a similar nature.

By reason of the specific bucket construction various loading and dumping positions may be made up in accordance with the structure desired without adding new parts or rearranging the bucket construction or the conveyor details of construction.

In the drawings attention is particularly directed to Figs. 1 to 10 inclusive wherein is shown a preferred embodiment of the invention and by reference to Fig. 1 it is to be noted that the conveyor embodying the form of the invention shown in Figs. 1 to 10 is assembled in a building, generally designated by the reference character B. The building comprises a lower floor L and an upper floor F extending between the side walls W. It is intended to provide a conveyor structure of the bucket type for the purpose of elevating the material from a lower conveyor run to an upper conveyor run and it is to be understood that while the preferred embodiment of the invention is shown mounted and supported within an enclosed chamber that the invention can be applied to various forms of frame work as desired.

As shown in Fig. 1, a series of brackets 10 are positioned on the floors and walls of the building in spaced relation for the purpose of supporting the runs of the conveyor and each of the brackets 10 comprises a rectangular shaped frame having side bars 11 connected at the ends by transversals 12. The side and end bars are preferably formed of channel-shaped bars to facilitate the easy manipulating and arrangement of the various parts of the conveyor. Each of the rectangular supporting frames 10 is adapted to be supported from the walls or floors of the building B by means of a pair of spaced supporting bars 13, the inner ends of which are adapted to be connected to suitable angle brackets 14 fastened to the wall or floor by suitable bolts or the like, as at 15. Angle brackets 14 are placed in opposed relation for receiving a pair of spaced blocks 16 having complementary cut-away portions for receiving a bolt 17 which extends therethrough and likewise extends through the angle bracket 14. Threaded on the end of the bolt 17 is a nut 18 to securely clamp the blocks 16 in position. Each of the blocks 16 is provided adjacent its ends with transverse bores 19 through which extend the rods 13 and said rods are secured in position by means of nuts 20 and 21 threaded on one end thereof in spaced relation one from the other. The free ends of the rods 13 extend through similar blocks 22 having transverse apertures 23 in alinement whereby the free threaded ends of the rods 13 may extend through the apertures 23 and may be fastened in place by nuts 24 clampingly engaging the blocks 22. The blocks 22 are likewise formed with complementary cut-away portions to provide an opening for receiving a bolt 25 the head of which as at 26a is adapted to be received in an opening formed in the block 26 so that the shank of the bolt will extend through an integral projection 27 formed on the block 26. It is intended to provide each end bar 12 with supporting rods 13 and to facilitate this, the blocks 26 are formed of a width equal to the width of the channel bars from which the end members 12 are formed so that the blocks will fit between the flanges thereof as is shown clearly in Fig. 10. A nut 28 may be threaded on the opposite end of the bolt 25 to securely hold the blocks 22 in position.

The channel ways or guides for the bucket conveyor are formed of angle bars 29 arranged with their flanges projecting inwardly toward the flanges of the opposite guides. The angle bars 29 are adapted to be held in position by means of hub bolts 30 having one end as at 31 hooked over the free edge of the channel flange so that the opposed end ways extend through suitable openings in the end channel bars 12 and blocks 26 whereupon nuts or the like, as at 33, may be threaded thereon for clamping the channel guide ways formed by the angle bars 29 and the blocks 26 to the end bars or channel members 12. This construction facilitates the supporting means wherein the rectangular supporting frames 10 may be adjusted to any desired position to accommodate variously positioned conveyor runs. The nuts 28 may be loosened and the frame shifted to any desired angle position during the assembly or setting up of the conveyor.

As noted in Fig. 1, the oppositely arranged channel guides formed by the angle bars 29 are bent as at 34 to form a corner guide way and similarly the guide ways are bent as at 35 and 36 to form an angular guide way 37. The top run of the guide ways 29 terminates a distance short of the wall W and opposed sections 29 are employed for interconnecting the upper and lower runs of the conveyor. A space is left between the upper and lower runs on the return side or unloaded side of the conveyor so that the bucket conveyor and connecting chains may be elongated through wear without affecting the operation of the conveyor. On the return side of the conveyor the buckets will be unloaded and therefore will feed to the lower horizontal run without employing sprocket or other guide means.

The conveyor is formed of a series of buckets generally indicated by the reference character 40 connected by a link chain which is generally designated by the reference character 41. Each of the buckets 40 comprises a pair of identically formed end members 42 which are semi-circular in shape and are adapted to be arranged in opposed relation, as shown clearly in Fig. 9. The inner wall of each of the end plates 42 is provided with a marginal rib or flange 43 in spaced relation from a similar flange 44 thereby providing a groove 45 for receiving a flexible sheet of material 46. The flexible sheet 46 may be formed of a piece of perforated or screen material if desired. The end edges of the flexible sheet of material 46 are seated in the grooves 45 and said flexible member 46 may be formed of a relatively light material having considerable rigidity such as phenolic condensation products or other material possessing the desired special characteristics.

Further, each of the semi-circular end walls 42 is provided with an enlarged hub portion 47 formed integral with the end walls and in alinement with the axis of the bucket. Each of the end walls is provided with an opening 48 formed in said hub portion through which extends a rod 49 having the opposite ends threaded for receiving retaining nuts 50 so that the end walls 42 may be drawn tightly against the transverse edges of the flexible curved sheet 46. Each of the end walls is likewise provided with a wing portion 51 which extends radially from the hub portion 47 and forms a web for reenforcing and strengthening the side walls 42 as well as providing a dumping means which will be hereinafter more fully described. The top edge of each of the end walls 42 is provided with a guide rib 53 likewise integral with the end wall for reenforcing the same in a direction at right angles to the wings or ribs 51.

The hub portions 47 are also provided with alined openings 54 for receiving a transversely extending supporting rod 55 and said rod 55 extends through a spacing sleeve 56 having its ends abutting the bucket tripping members 57 as is clearly illustrated in Fig. 9. The bucket tripping members 57 are received in cut-away recesses 58 formed in the opposite portions of the hubs 47 so that the sleeve 56 will urge the tripping arms 57 into position when the tie rod 49 is tightened to draw the end walls 42 together. It is intended to provide each of the end walls 42 on its inner side with said cut-away portions 58 for receiving the tripping arms 57 and said tripping arms are intended to be shaped at their inner ends to conform to the shape of the cut-away or depressed portion 58. The buckets thus formed provide a substantially rigid structure capable of withstanding considerable weight and it is to be noted that the buckets are balanced by reason of the material being carried well below the supporting rod 55. The tripping arms 57 may have their free ends extending at right angles as at 60 or if desired, they may be positioned as shown in Fig. 1 at 61 so as to provide oppositely extending arms whereby the buckets may be tilted or dumped while travelling in either direction. Likewise, the ends of the arms 57 may be angularly formed as shown in Fig. 4, as at 62, so that the buckets may be tilted or dumped at the unloading station while travelling in an inclined runway such as the runways 37, shown in Fig. 1. It is intended to provide a series of differentially shaped tripper arms 57 so that they may be interchanged depending upon the dumping positions and the unloading stations. The tripping arms 57 may be easily interchanged by simply removing the nuts 59 and withdrawing the supporting rod 55 for the positioning of the proper tripping arms. Likewise, broken bucket parts may be similarly interchanged thereby eliminating the loss of time for replacing the parts and assembling the conveyor structure to the desired form.

The free ends of each of the supporting rods 55 are provided with rollers 63 and positioned on each side of the rollers are spaced outer chain links 64 and inner chain links 65. The rollers 63 are so positioned as to be guided in the channel way or guide formed by the angle bars 29 and the alternate ends of the inner and outer chain links 65 and 64 respectively are provided with connecting pins 66 likewise having rollers 67 guided in the channel ways formed by the angle bars 29. A washer or the like, as at 68 may be interposed between the inner chain links and the hubs 47 to prevent the chain links 65 and 64 from moving inwardly. The free ends of each of the supporting bars 55 is flattened as at 70 to provide a shoulder 71 as shown clearly in Fig. 7. Alternate inner links of the outside sets 64 and 65 are provided with slotted openings 72 as indicated in Fig. 8 so as to limit the inward movement of the outermost links and to prevent the links from becoming tightened upon the rods. The inner links 65 are both provided with round apertures and connect the bucket supporting rods 55 for free swinging movement thereon. The inner and outer links 64 and 65 are interconnected and retained in position by the pin 66 having a cotter key or the like 73 and each of the pins 66 is likewise flattened as at 74 similar to the rods 55 so as to prevent inward movement of the links 64 and 65 on the pin 66. Cotter keys or pins 75 extend through openings 76ª in the extreme free ends of the bucket supporting rods 55 to prevent displacement of the links and the rollers 63.

In order to prevent endwise play of the buckets during their travel between the channel guides formed by the angle bars 29 slide shoes 76 are interposed between adjacent outer links 64. The shoes 76 are provided with angularly bent foot portions 77 suitably apertured for receiving alternate sets of supporting rods 55 and connecting pins 66. It is to be noted that the hub 47 of each bucket end wall projects outwardly a considerable distance in the form of a reduced hub portion so as to adequately space each of the buckets 40 and thereby prevent endwise play as well as to position the chain links 64 and 65 a sufficient distance so that the wings 51 on the end walls 42 will not be obstructed during the turning movement or tilting of the buckets.

It is to be noted that the transverse edges of the flexible members 46 are angularly bent to form lips 80 and one edge of each bucket is provided with a flexible sealing member 81 fastened in place by means of equi-distantly spaced rivets 82 or the like and said flexible strips 81 are arranged so as to partially overlap the lips 80 of an adjacent bucket and thereby seal the space between the buckets to prevent material from falling therebetween to the floor or ground.

By reason of the fact that the sealing strips 81 are only mounted on one edge or lip 80 of each bucket the buckets are allowed to tilt in either direction depending upon the movement of the conveyor chains.

By reference to Fig. 1 it will be noted that a pair of sprocket wheels 83 are mounted on a drive shaft 84 and said sprocket wheels 83 are spaced a distance equal to the space between the sprocket chains formed by the links 64 and 65. The teeth of the sprocket wheels 83 are formed relatively large to receive the rollers 63 and 67 of each bucket assembly. The shaft 84 may be provided with a suitable pulley over which is trained a pulley belt 85 adapted to be driven by a motor as indicated at 86. The armature shaft of the motor will be provided with a similar pulley for drivingly engaging the belt 85.

In Fig. 1 it will be noted that a supply hopper 87 is supported above the lowermost conveyor bucket run for feeding material to the buckets 40 at the bottom therebeneath. A dispensing opening 88 is formed in the lower portion of the hopper 87 and is controlled by a slide gate or the like, as at 89, so that the material will be fed to the buckets in controlled amounts. Supported on the channel guide ways 29 are suitable brackets 90 having bearing portions 91 for receiving a spindle 92 on the outer end of which is rotatably mounted a roller 93 positioned above the roller guide 53 of each bucket so that the buckets will be maintained in a horizontal position as they travel beneath the filling hoppers 87. It is intended to position the rollers 93 in spaced relation so that the buckets will be engaged by at least two rollers 93 during their travel beneath the filling station or hopper 87 as is clearly indicated in Fig. 1. The brackets 90 may be held in place on the channel guide ways 29 by means of suitable bolts 94.

After the loaded buckets have moved to the upper horizontal conveyor run by moving in the direction indicated by the arrows in Fig. 1, they may be dumped at an unloading station into a hopper 95 having a relatively wide mouth portion 96 by means of tripping arms 57. Directly above the hopper 95 and supported between the channel guide ways 29 is a tripper rod 96 having its free ends rotatably supported in bearing brackets 97 fastened in place by machine screws or the like as at 98. Retaining collars 99 are secured to the ends of the rod 96 in spaced relation thereon so as to be positioned on opposite sides of the brackets 97 and thereby prevent endwise movement of the trip rod 96. As the free ends 60 of the trip arms 57 engage the rod 96 the buckets are tilted and rocked so that the contents will fall into the hopper 95. Should it be desired to dump the buckets at another unloading station, it is simply necessary to remove the rod 96 so that the material will be carried to another dumping station having a hopper 100 with a funnel shaped throat 101 so that the buckets may be tilted above said throat. It may be desirable to provide a different form of tripping means for unloading station or hopper 100 and to accomplish this, bracket members 102 have their bases 103 secured to the underside of the channel guide ways 29 as indicated in Fig. 3 by bolts 104. A shaft or spindle 105 is rotatably supported in the bracket 102 and is provided at one end with a retaining collar 106 and at the opposite end to a roller 107 having a relatively large hub portion 108. The end of the spindle 105 is provided with a head 109 to prevent displacement of the roller 107 and it is to be noted that a pair of such rollers 107 are positioned directly above the unloading station or hopper 100 so as to impart a complete rotation to each bucket as it traverses the throat 101. By reference to Fig. 2 it will be seen that the tripping wing 51 is first engaged by the roller 107 and upon continued travel of the conveyor the next roller 107 engages the roller guide 53 whereupon the bucket will be turned about a complete revolution to completely dislodge any material adhering thereto.

The tripping roller 107 will be used at the end of the conveyor travel and the supplemental tripping means may be used in advance thereof.

It is to be noted that the rollers 107 are spaced a sufficient distance so that the first roller engaged will impart an initial rocking movement to each bucket 40 and the continued travel of the bucket conveyor will position the guide 53 so that the front edge is in engagement with the second roller 107.

Should it be desired to unload in an inclined position of the channel guide ways 29 a hopper 110 is provided beneath the angularly disposed run ways 37 as shown in Fig. 1 and in this case, a tripping rod 96 will be positioned between the channel ways of the angular run 37 and tripping arms 57 having the angularly disposed free end 62 will be supplied to the ends of the buckets in lieu of the tripping arms 57 having the ends 60 formed at right angles to the tripping arms. The hoppers 95, 100 and 110 are provided with outlets 112, 113 and 114 respectively for discharging of material into a chute, vehicle or bin, or other chamber.

The oppositely disposed channel forming angle bars 29 may be welded at spaced intervals as indicated at 115 or other means for fastening the channel way angle irons may be provided to suit the requirements of the particular construction.

Obviously, bars of channel formation may be substituted for the channel way forming angle bars 29 but it has been found in practice that by employing angle bars various forms and shapes may be imparted thereto without considerable expense.

*Operation of the form of the invention shown in Figures 1 to 10 inclusive*

For consideration of the operation of the invention it will be assumed that the channel way forming angle bars 29 have been adequately supported by the walls W and upper and lower floors F and L respectively by means of the brackets 10 located at equally distant points. The motor 86 is started to drive the sprocket wheel 83 to cause the bucket conveyor, including the chains and buckets 40 to travel in the direction as indicated by the arrows in Fig. 1. The hopper 87 is filled with material and the gate 89 is controlled to allow the material to be dispensed into the buckets 40 as they are travelling the area beneath the hopper and during their travel through this area the rollers 93 engage the roller track ways 53 at each side of the bucket and maintain the same in a horizontal position against tilting or tipping. As the loaded buckets pass horizontally to the vertical run they are guided by the bends 34 and pass upwardly over the angle portion 37 about the curved portions 35 and 36 of the channel forming angle bars 29. As the loaded buckets reach the upper horizontal course above the floor F they may be tripped at the dumping station or hopper 95 by means of the bar 96 engaging the tripping arms 60. Should it be desired to dump the loaded buckets at a different location the trip bar 96 is removed to allow the loaded buckets to continue to another station or hopper 100. As the buckets enter the area above the hopper 100 the wings 51 on each side of the conveyor bucket end walls engage a pair of spaced rollers 107 supported on each side of the track ways and depending from each channel way forming angle bar 29. As the wings or ribs 51 engage the first roller the bucket is tilted as is shown in Fig. 2. Upon continued travel of the bucket in the tilted position the forward edge of the roller engaging guide 53 will be forced downwardly into engagement with the second roller. Upon continued travel of the bucket a complete revolution will be imparted thereto so as to displace the contents of each bucket as it traverses the unloading station or hopper 100.

It may be found desirable to provide each of the buckets with a tripping arm so that the buckets will be tripped regardless of the direction of travel and in this instance suitable arms 61 are substituted for the tripping arms 60 so that the opposite extending tripping arms 61 will engage the tripping rod 96 at the loading station. One advantage of this structure would be to traverse the loading and unloading positions so that it will be possible to load the conveyor on the top run and dump the same at the lower run as shown in Fig. 1, by the tripping rod 96 which is positioned above a spout or the like S, in advance of the hopper 87 when the conveyor buckets are travelling in the direction opposite to that indicated by the arrows.

It will thus be seen that the direction of travel of the bucket conveyor may be reversed and the buckets may be loaded at the top and dumped at the bottom floor L and after dumping they may be loaded at the station 87 and dumped in the hopper or unloading station 100 at the floor F. Since the rollers 107 will likewise engage the wings 51 of the buckets in either direction the buckets will be tilted and unloaded prior to their loading and at a subsequent station for unloading at the lower floor L by the tripper rod 96 which is positioned above the spout or hopper mouth S.

Should it be desired to unload at angular positions as at 37, the conveyor buckets are provided with tripping arms 57 having diagonally extending free ends 62 as illustrated in Fig. 4. This construction allows the tripping rod to be mounted in such a position on the angular or inclined portion 37 so as not to interfere with the horizontal position of the buckets during their travel therethrough.

It will be seen that the tripping rods 96 and tripping rollers 107 may be positioned as desired to facilitate the unloading of the bucket conveyor at convenient points along the runs.

*Description of the form of the invention shown in Figs. 11 and 12*

In Figs. 11 and 12 there is shown a modified hopper construction and in this modification the channel way forming angle irons 29 and buckets 40 are of substantially the same construction as that illustrated in Figs. 1 to 10 inclusive, and the buckets 40 are connected by chain links carrying rollers for being guided in the channel ways 29. Rollers 93 are supported by brackets or the like in equidistantly spaced relation on the channel formed angle bars 29 and said rollers 93 engage the roller engaging guides 53 at the end of each bucket to maintain the buckets in a horizontal position while travelling beneath a filling hopper 116. The outlet 117 of the hopper 116 is presented to the buckets in substantially the same manner as at the spout 88 of the hopper 87, as shown in Fig. 1.

Secured to one wall of the hopper 116 is a pair of angle brackets 118 arranged in opposed relation and mounted between said angle brackets and rockingly supported thereon is a V-shaped plow 119 adapted to engage the material in the buckets after they have been filled from the hopper 116 so that the material will be spread equally throughout the length of each bucket. The plow 119 is provided with angle braces 120 welded or otherwise fastened in place as at 121 and said braces 120 are pivoted to the brackets 118 by bolts or the like 122 whereby the plow 119 will swing vertically on the bolts 122 when the plow encounters obstructions or lumps in the material in the buckets. Downward movement of the plow 119 is limited by means of the apex portion of the plow as at 123 engaging the extreme lower end of the hopper 116 to thereby prevent the plow from falling downwardly toward the buckets and interfering with the progress thereof.

*Detail description of the form of the invention shown in Figs. 13 to 16 inclusive*

In the modification of the invention shown in Figs. 13 to 16 inclusive an angle frame 125 is provided for supporting a channel way formed of angle bars so as to provide a particular bucket type conveyor capable of being shifted to various positions and locations.

The angle frame 125 comprises a pair of slide frame bars 126 of channel formation connected at each end by transverse channel bars 127 welded or otherwise secured in position relative thereto. Each end of the transverse channel bars 127 is provided with brackets 128 for supporting caster wheels 129 upon which the frame is adapted to rest and it is to be noted that the brackets 128 likewise space the frame 125 from the floor surface. Adjacent one end of the frame bars 126 is a pair of vertical uprights 130 likewise of angle formation and the lower ends of the uprights 130 are fastened in place by means of a bracket 131 having one of its flanges riveted or otherwise secured to the upper flange of each channel frame bar 126 while the opposite flange 132 is riveted to the lower portion of each of the uprights 130.

Extending between the side channel frame bars 126 and the vertical uprights 130 is a pair of diagonal channel shaped frame bars 133 having their flanges inwardly disposed for providing supporting surfaces for the conveyor structure which will be hereinafter more fully described. The lower end of each of the diagonal channel bars 133 has its web portion bolted, as at 134, to the channel shaped frame bars 126 and the upper ends of each of the diagonal channel shaped bars 133 are supported on the top of the vertical uprights 130 and as shown in Fig. 13 a bracket 135 is provided for securing the upper ends of the diagonal channel shaped bars 133 and uprights 130 in position. The angle brackets 135 may be riveted or otherwise fastened in place to complete the structure.

Extending between the diagonal shaped bars 133 and the vertical uprights 130 is a pair of horizontal platform supporting bars 136 fastened in place by means of rivets 138 and 139 respectively and said angle bars 136 are adapted to support a suitable platform 140 for a driving motor 141 the base of which, as at 142 is riveted or otherwise secured as at 143 to the platform 140. The above frame structure is intended to support a pair of channel ways 144 similar to the channel ways 29 in Figs. 1 to 10 inclusive and the channel ways 144 are formed of a pair of angle bars 145 with their overlapping flanges suitably fastened together as by welding or the like. The channel ways 144 may be bent into S-shape longitudinally to provide a pair of adjacent run ways for guiding the bucket conveyor in the direction of the arrows indicated in Fig. 13. The channel ways 144 are adapted to be supported both vertically and horizontally by means of diagonal channel bars 133 and to facilitate this, bearing brackets 146 are arranged at spaced intervals in the upper and lower inwardly directed flanges of the diagonal channel shaped bars 133 so that said brackets 146 will extend above the diagonal channel shaped member while others will extend below. All of the brackets 146 are of substantially the same shape and construction and have their bases 147 secured in position to the respective flanges of the diagonal channel shaped bar by means of bolts or the like as at 148. Each of the bearing blocks 146 is provided with an opening 149 through which extends a bolt 150 upon which is supported a pair of complementary supporting blocks 151. A nut 152 is threaded on the opposite end of the bolt 150 to securely clamp the complementary blank 151 into position. Each of the complementary blocks is provided with a transverse opening for receiving the lower threaded end of a pair of supporting rods 153 so that the supporting rod may be locked in position by nuts 154 threaded on the rod and engaging the complementary blocks 151 so as to clamp the same upon the bolt 150. The extreme free ends of the channel guide supporting rods 153 are likewise provided with complementary blocks 155 similar to the blocks 151 so that the oppositely threaded end of each of the rods 153 may extend through openings adjacent each end of the blocks to be clamped into position by nuts 156 clampingly engaging the blocks 155. Since the supporting rods 153 are of identical formation it is to be noted that adjustment may be had by simply adjusting the length of the rods through the medium of the nuts 154 and 156. Extending and clamped between the complementary blocks 155 is a transverse rod 157 the ends of which are screw-threaded as at 158 for receiving nuts 159. The supporting rod 157 extends through complementary cutaway portions in the blocks 155 so that the nuts 159 may tightly lock the rod 157 into position.

Adjustably supported by means of the rod 157 is a pair of channel guide brackets 160 having an apertured boss 161 for receiving the rod 157 so that the brackets 160 may be adjusted rotatably thereon. The end of each bracket is provided with a pair of spaced bracket arms 162 and 163 providing inner and outer supports respectively for the channel guide ways 144. Set screws 164 are threaded in the outermost bracket arms 162 for clampingly engaging the channel ways 144 to thereby lock and hold the same in position. By reference to Fig. 13 it is to be noted that a pair of channel guides 144 are employed and that the upper ends thereof terminate a distance short of the diagonal channels bars 133 while the lower portions are co-extensive with the channel frame bars 126 to thereby facilitate the unloading and loading of the bucket conveyors guided by the channel ways. It is intended to support the channel guides 144 in spaced relation by means of the supporting brackets 160 which, as shown in Fig. 13, comprises a vertical and horizontal bracket at the top portion of the conveyor guide ways 144 and likewise vertically and horizontally disposed brackets for supporting the lower portion of the spaced channel ways or guides 144.

Obviously additional supporting rods 153 and brackets 160 may be employed for supporting the channel guides 144 and the relative positions of the spaced guides 144 may be changed vertically and horizontally by simply moving the brackets 160 relative to the channel ways or guides 144.

The bucket conveyor comprises a pair of endless chains generally designated by the reference character 165 and said chains are adapted to be supported by means of a shaft 166 carried on the upper end of the bearing bracket arms 167 secured to the upper extreme end of each diagonal channel bar 133 by rivets or the like, as at 168. The chains 165 are trained over sprocket wheels 169 adjacent each end of the shaft 166 and positioned in advance of the sprocket wheel 169 is a receiving hopper 170 supported by the channel bars 133 by means of strap irons 171 at each side thereof. The strap irons 171 are fastened in place to a hopper 170 and diagonal channel bars 133 by rivets 172 and 173 respectively.

The opposite end of the endless chain 165 is adapted to be supported by a pair of spaced sprocket wheels 174 carried by a shaft 175 supported in sliding bearing blocks 176. The slide bearing blocks 176 are longitudinally movable in oppositely disposed slots 177 formed in the web portions of said channel bars 126 whereby the sprocket wheels 174 may be adjusted to take up the slack in the chain 165. To facilitate the adjustment each of the blocks is provided with a screw-threaded rod 178 extending through a projection 179 secured to or formed integral with the channel shaped bars 126. Adjusting nuts 180 are provided on the threaded rods 178 to draw the blocks 176 toward one end of the frame and thereby take up the slack or wear in the endless chain 165. It is to be noted that the sprocket wheels 169 and 174 are of a diameter equal to the overall space between channel ways or guides 144 so that as the chains 165 are fed into and out of the ends of the channel ways while traversing the sprockets they will be alined therewith and eliminate any wear at the end portions of the channel guides or ways.

The links of the chain 165 are provided with rollers 181 which travel in the channel ways or guides 144 and space the chains 165 from the equally directed flanges thereof.

Mounted between alternate links and rollers 181 is a series of buckets 182 which are substantially identical in shape and formation to the buckets 40 shown in Figs. 1 to 12 inclusive. Each of the buckets 182 is provided with a V-shaped flexible member 182ª the ends of which are clamped between similarly shaped end walls 183. The top portions of the end walls are provided with roller engaging guide ways 184 which are formed integral with the end walls and said roller engaging guide ways 184 are braced by radially extending ribs or webs 185. Each end wall 183 is provided with an enlarged hub portion 186 through which extends a supporting rod 187 and the ends of which project beyond the end walls 183 and form the link pins of alternate links of the chain 165. The free end of the supporting rod 187 projects through the inner and outer links 190 and 191 and are suitably fastened by means of cotter keys or the like in a manner similar to the form of the invention shown in Figs. 1 to 10 inclusive.

Supporting rollers 193 are likewise carried by the free ends of the rods 187 and said rollers 193 are mounted between and alternate with the rollers 181 carried between the chain links 190 and 191. The end walls 183 of each bucket are drawn together in clamping engagement with the V-shaped flexible body portion 182ª by means of the tie rod 194 extending longitudinally of the buckets and nuts are provided in the ends of the tie rods for drawing the end walls toward each other.

Spacing sleeves 195 are mounted on the supporting rod 187 to hold the end walls 183 in spaced relation against the clamping action imparted to the end walls by the tie rods 194.

The sprocket wheel 169 is adapted to be driven by the motor 141 and for this purpose the armature shaft 197 of the motor is provided with a pulley over which is trained a belt 198 for likewise being trained over a pulley carried by the shaft 166. Preferably the pulley on the shaft 166 will be positioned at one end thereof so that the belt 198 will not interfere with the conveyor buckets 181 and chains 165.

Likewise adjacent each end of the shaft 166 and between the sprocket wheels 169 is a pair of collars 199 which may be formed as integral hub portions of the sprocket or formed separately and positioned as shown in Fig. 16 so as to engage the wings or webs 185 and thereby rock the buckets 182 as they traverse the sprocket wheels to impart a tilting motion thereto so that the material carried thereby will be fed into the hopper 170 before the return course of the conveyor run is started. After the buckets 182 are tilted, continued travel thereof causes the buckets to be completely rotated by being moved into a position through the medium of the collars 199 through over balanced buckets so that they will again assume a horizontal position during the return travel.

The loading station includes a hopper 200 positioned above the uppermost run of the bucket conveyor and said hopper is supported from each side of the frame 126 by means of vertically extending strap irons 201 the upper ends of which are fastened in place by rivets 202 secured to the hopper while the lower ends are similarly riveted in place by means of rivets 203 extending therethrough and through the side channel frame bars 126. The mouth of the hopper 204 is presented to the conveyor buckets and is provided with a gate 205 to facilitate the control of the material being fed therefrom whereby the feeding may be restricted, if desired, depending upon the material being handled.

Mounted in the uppermost flange of each of the upper runs of the channel way guides 144 is a longitudinal bar 206 the ends of which are fastened in place by means of rivets or the like as at 207. The bar 206 forms a bracket of elongated formation for supporting a series of spindles 208 upon which is mounted inwardly projecting rollers 209. The peripheries of the rollers 209 are presented above the roller engaging guide way 184 formed integral with the end walls 183 for maintaining the buckets in a horizontal position as they travel beneath the filling hopper 200.

In bucket conveyor structures where the sealing strip is eliminated it may be desired to collect the material falling between the buckets and this is accomplished by means of a transversely extending drawer 210 slidably mounted in a slot 211 provided at the lower portion with angle bar guide ways 212. The drawer 210 is provided with a handle 213 so as to enable the drawer to be removed to collect the material passing between the buckets.

The extreme inner ends of the angle bar guide ways 212 may be welded in place to the opposite channel frame bar 126 or if desired, can be supported in any suitable manner.

At various locations it may be possible to support the spaced channel guide ways 144 by means of strap irons or the like 214 riveted to the channel shaped frame bars 126 by means of rivets or the like, as at 215. The strap irons 214 may be formed similar to the bracket 160 with spaced channel receiving jaws similar to the outer and inner jaws 161 and 162 respectively, shown in Fig. 14.

*Operation of the form of the invention shown in Figs. 13 and 16 inclusive*

After having decided upon the location in which the conveyor is to be used, the frame 125 may be wheeled into position so as to locate the discharge hopper 170 above a bin, vehicle, or other hopper. The material to be fed is supplied to the hopper 200 so that the same will fall downwardly into the buckets 182 to completely fill the same. The motor 141 is then started to cause the buckets 182 to traverse the channel guide ways 144 so that as each loaded bucket reaches the sprocket wheel 169 it will be tilted and rotated to dump its contents into the hopper 170 on the bin over which the hopper is placed.

It is to be noted that various adjustments may be made to the conveyor structure shown in Figs. 13 to 16 inclusive and that various forms of the channel guides may be used instead of the S-shaped guides as shown in Fig. 13.

What I claim is:

1. A conveyor, comprising a pair of channelways formed of angle irons with two of their flanges fastened together in overlapping relation, brackets for supporting the channelways in opposed relation, projections carried by each bracket, a pair of clamping blocks mounted on each projection, supporting rods extending through said blocks on each side of said threaded projection, means for fastening said rods to said blocks, an endless chain having spaced rollers for each channelway, conveyor buckets extending across and connecting alternate rollers of said endless chains, conveyor supporting means, a projection carried by said supporting means, and a second pair of clamping blocks carried by the supporting rods for attachment to said last-named projections carried by the supporting means.

2. A conveyor, comprising a pair of oppositely disposed channelways, bracket supports for the channelways, projections carried by each bracket, a pair of clamping blocks mounted on each projection, supporting rods extending through said blocks on each side of said threaded projection, means for fastening said rods to said blocks, an endless chain guided by each channelway, guide rollers on said chain, a series of conveyor buckets connecting alternate rollers of said endless chain in spaced relation thereon, conveyor supporting means, a projection carried by said supporting means, and a second pair of clamping blocks carried by the supporting rods for attachment to said last-named projections carried by the supporting means.

3. A conveyor, comprising a pair of oppositely disposed channelways, supporting brackets for said channelways adapted to be arranged in various positions at the sides of said channelways, means for detachably clamping said channelways to said brackets, an endless chain having supporting rollers for each channelway, conveyor bucket supporting rods extending between alternate chain rollers, a series of conveyor buckets suspended from said supporting rods carried by and between said endless chains, means for driving the endless chains, projections carried by each bracket, a pair of clamping blocks secured to each projection, supporting rods having threaded end portions for being received in openings in said clamping blocks on each side of said projection, threaded fastening members on the threaded portions of said rods for clamping said blocks to said projection, and means for supporting the free ends of said rods.

4. A conveyor, comprising a pair of oppositely disposed channelways, bracket members for supporting the channelways in various positions to form a conveyor guideway, a projection carried by each bracket, a pair of clamping blocks having recesses for receiving said projection, supporting rods extending through openings in said blocks, threaded members on said rods for clamping the blocks to said projection, an endless conveyor chain adapted to travel in each channelway, conveyor bucket supporting rods extending between alternate links of said chains, conveyor buckets suspended from said supporting rods between said chains, means for filling the buckets at a loading station, tripping means for discharging the material in the buckets at an unloading station, means on the end walls of said buckets engageable with guide means at the side of said loading station to retain said buckets in a substantially horizontal position as they traverse said loading station.

5. A conveyor, comprising a pair of opposed channelways arranged in parallel spaced relation with their channels in face to face position, brackets for supporting the channelways at spaced intervals throughout their lengths, projections carried by said brackets, a pair of clamping blocks for each projection, supporting rods having threaded portions adapted to extend through openings in said blocks, nut members on said threaded portions for clamping said blocks to said projections, an endless conveyor chain adapted to be guided in each channelway, pivoted conveyor buckets extending transversely of the chains and pivotally connected thereto, means for loading the buckets at a charging station, means for dumping the buckets at a discharge station, means on the end walls of said buckets engageable with guide means adjacent said charging station for maintaining the buckets in a horizontal position as they traverse the charging station, and means for adjustably holding said supporting rods.

6. A conveyor, comprising a pair of channelways arranged in opposed face to face parallel relation, bracket members for supporting the channelways in various positions to form a conveyor trackway, a projection carried by said bracket members, a pair of clamping blocks for each projection, supporting rods having threaded portions for being received in openings in said clamping blocks, nut members on said rods for securing said rods to said blocks and clamping said blocks to said projection, an endless chain having rollers mounted between certain links adapted to be guided in each channelway, a series of tiltable conveyor buckets extending across and connecting the endless chains, means for charging the conveyor buckets, conveyor bucket guide means at each side of said charging means, means for discharging the conveyor buckets, means on the end of each conveyor bucket engageable with said guide means for maintaining the buckets in a horizontal position during the charging thereof, and means for supporting the free ends of said supporting rods.

7. A conveyor, comprising a pair of channel guides forming spaced conveyor trackways, bracket members for supporting the guides in parallel spaced relation, a projection carried by said bracket members, a pair of clamping blocks for each projection, supporting rods having threaded portions for being received in openings in said clamping blocks, nut members on said rods for securing said rods to said blocks and clamping said blocks to said projections, endless conveyor chains adapted to travel in said guides, tiltable conveyor buckets pivotally connecting said endless conveyor chains, means for charging the buckets between certain sections of the trackways, guide means adjacent said charging means, means for tilting and discharging the buckets at a point remote from the charging position, means on the end walls of said conveyor buckets engageable with said guide means for maintaining the buckets in a horizontal position during their movement at the charging position, and means for supporting the free ends of said supporting rods.

8. A conveyor, comprising a portable frame structure, a pair of opposed channel guides providing a conveyor trackway, brackets affixed to the portable frame for supporting the channel guides in spaced relation from the portable frame in various angular positions, transversely extending shafts mounted at each end of said trackway, conveyor chain sprockets mounted on said shafts, an endless conveyor chain guided in each trackway and trained over the sprockets at each end thereof, tiltable conveyor buckets extending between and connecting the endless conveyor chains, said buckets being guided by the trackways between said sprocket chains, loading station means for charging the conveyor buckets, tripping flanges formed on the end walls of said conveyor buckets, an annular member mounted on one of the shafts of said conveyor chain sprockets having a peripheral portion engageable with said tripping flanges for tilting the buckets and discharging material therefrom as said buckets traverse said sprockets, and means for maintaining the buckets in a horizontal position during charging.

9. A conveyor, comprising a portable frame structure, a pair of spaced parallel trackways supported by the frame structure, rotatable shafts at each end of said trackway, conveyor chain sprocket members at each end of said shafts, conveyor chains adapted to be guided in the trackways and trained over said sprockets, a series of conveyor buckets connecting the conveyor chains, means for loading the buckets as they traverse a charging station, tripping flange members on the ends of said conveyor buckets, an annular member mounted on at least one end of one of said shafts having a peripheral portion engageable with said tripping flanges for dumping the buckets as they traverse the conveyor sprockets on said rotatable shaft, and means for maintaining the buckets in horizontal alignment during their travel through the charging station.

10. A conveyor, comprising a portable frame structure, channelways adapted to be supported by the frame structure to provide a circuitous endless trackway, rotatable shafts at each end of said trackway, conveyor chain sprockets at the ends of said shafts, an endless conveyor chain guided in each trackway and trained over said sprockets, bracket members connected to the portable frame for adjustably supporting the trackways, a projection carried by each bracket member, a pair of clamping blocks having complementary notches for receiving projecting supporting rods extending through openings in said clamping blocks, nut means on said supporting rods for clamping said blocks to said projections, a series of conveyor buckets guided in the trackways and propelled by the endless conveyor chains, tripping flanges at each end of said conveyor buckets, means for loading the buckets, circular tripping flange engaging means on one of said shafts for tilting and discharging the buckets at the upper portion of the frame as they traverse one set of conveyor sprockets thereat, and means for anchoring the free ends of said supporting rods to said portable frame.

11. A bucket conveyor structure, comprising a pair of opposed channelways providing a circuitous conveyor trackway, bracket members for supporting said channelways, projections carried by said brackets, clamping blocks having complementary notches for receiving said projections, a pair of supporting rods extending through said clamping blocks on each side of said projection, nut members for clamping said rods to said blocks and for holding said blocks in clamping engagement with said projections, endless conveyor chains adapted to be guided in said trackway, anti-friction rollers carried by said conveyor chains at spaced intervals thereon, a series of spaced rods connecting the chains at equidistant points thereon and extending into said trackway between said anti-friction rollers, anti-friction elements carried by the ends of said rods for supporting the chains and said rods in the trackway, a conveyor bucket tiltably supported on each of the connecting rods with said rods extending through the side walls of said buckets, tripping arms secured to each bucket adapted to engage an obstruction carried by the trackway, and means for supporting the free ends of said supporting rods.

HENRY W. HAPMAN.

REFERENCES CITED

The following references are of record in the file of this patent:

UNITED STATES PATENTS

| Number | Name | Date |
| --- | --- | --- |
| 466,039 | Hunt | Dec. 29, 1891 |
| 503,870 | McCaslin | Aug. 22, 1893 |
| 660,451 | McCaslin | Oct. 23, 1900 |
| 712,585 | Peck | Nov. 4, 1902 |
| 1,090,156 | Kendall | Mar. 17, 1914 |
| 1,868,780 | Valtier | July 26, 1932 |